US009302802B2

(12) United States Patent
Piana

(10) Patent No.: US 9,302,802 B2

(45) Date of Patent: Apr. 5, 2016

(54) METHOD AND APPARATUS FOR OPERATING A PLANT FOR THE TREATMENT OF CONTAINERS WITH CONTROLLED PARAMETER SELECTION

(75) Inventor: Stefan Piana, Koefering (DE)

(73) Assignee: KRONES AG (DE)

( * ) Notice: Subject to any disclaimer, the term of this patent is extended or adjusted under 35 U.S.C. 154(b) by 1081 days.

(21) Appl. No.: 13/189,484

(22) Filed: Jul. 22, 2011

(65) Prior Publication Data

US 2012/0032364 A1 Feb. 9, 2012

(30) Foreign Application Priority Data

Aug. 3, 2010 (DE) ......................... 10 2010 033 170

(51) Int. Cl.

| | |
|---|---|
| ***B29C 65/48*** | (2006.01) |
| ***B65B 59/00*** | (2006.01) |
| ***B65B 57/00*** | (2006.01) |
| ***B67C 3/00*** | (2006.01) |

(52) U.S. Cl.

CPC ................. *B65B 59/00* (2013.01); *B65B 57/00* (2013.01); *B67C 3/007* (2013.01)

(58) Field of Classification Search

CPC ............ B29C 2037/80; B29C 2037/90; B29C 2037/906; B29C 2037/903; B65B 59/00; B65B 59/02

USPC .......................................... 264/40.1; 425/135

See application file for complete search history.

(56) References Cited

U.S. PATENT DOCUMENTS 5,317,902 A 6/1994 Stieger et al. .................. 73/49.2
5,612,525 A 3/1997 Apter et al.
5,913,344 A 6/1999 Wronski et al.
6,620,352 B1 * 9/2003 Davis ...................... B29C 49/78 264/40.4
6,732,921 B1 5/2004 Heuft et al.
7,221,997 B2 5/2007 Bongers et al.
7,684,889 B2 3/2010 Focke et al.
2003/0229417 A1 12/2003 Gyger et al.
2005/0145259 A1 7/2005 Focke et al. ................... 131/283
2005/0194705 A1 * 9/2005 Smith .......................... 264/40.1
2007/0162287 A1 7/2007 Dietzsch et al.

(Continued)

FOREIGN PATENT DOCUMENTS

| | | | |
|---|---|---|---|
| CN | 1068650 | 2/1993 | .............. G01F 17/00 |
| CN | 1639008 | 7/2005 | .............. B65B 19/28 |
| DE | 692 17 887 T2 | 7/1997 | |

(Continued)

OTHER PUBLICATIONS

European Search Report dated Oct. 27, 2011, issued in counterpart European Application No. 11175897.5.

(Continued)

*Primary Examiner* — Galen Hauth

(74) *Attorney, Agent, or Firm* — Hayes Soloway P.C.

(57) ABSTRACT

A method of operating a plant for the treatment of containers may include treating the containers with pre-set treatment parameters by a first treatment unit of the plant. The treatment parameters are capable of being altered at least in part and depend at least in part upon product parameters—characteristic of the container—of the containers to be treated. At least one product parameter characteristic of the container is determined by detecting a recognition mark associated with the container, and at least one treatment parameter is altered on the basis of this characteristic product parameter.

29 Claims, 4 Drawing Sheets

(56) References Cited

U.S. PATENT DOCUMENTS

| | | | | |
|---|---|---|---|---|
| 2008/0271809 | A1 * | 11/2008 | Goldman et al. | 141/9 |
| 2010/0141756 | A1 * | 6/2010 | Grote et al. | 348/127 |

FOREIGN PATENT DOCUMENTS

| | | | |
|---|---|---|---|
| DE | 196 05 440 | A1 | 8/1997 |
| DE | 199 03 586 | A1 | 8/2000 |
| DE | 602 02 937 | T2 | 4/2006 |
| DE | 20 2006 015 150 | U1 | 11/2007 |
| EP | 1 471 008 | A1 | 10/2004 |
| EP | 1 480 882 | B1 | 12/2004 |
| EP | 1 561 689 | A1 | 8/2005 |
| JP | 4-219805 | A | 8/1992 |
| JP | 10-254537 | A | 9/1998 |
| JP | 2002-154547 | A | 5/2002 |

OTHER PUBLICATIONS

Japanese Office Action dated Mar. 31, 2015, issued in corresponding Japanese Application No. 2011-160039.

English translation of 1st Chinese Office Action issued in corresponding Chinese Patent Appln. No. 201110205263.2 dated Jun. 24, 2015 (2 pgs).

* cited by examiner

METHOD AND APPARATUS FOR OPERATING A PLANT FOR THE TREATMENT OF CONTAINERS WITH CONTROLLED PARAMETER SELECTION

CROSS-REFERENCE TO RELATED APPLICATION

This application claims the benefit of priority of German Patent Application No. 10 2010 033 170.8, filed Aug. 3, 2010, pursuant to 35 U.S.C. 119(a)-(d), the disclosure of which is incorporated herein by reference.

TECHNICAL FIELD

The present invention relates to a method of operating a plant for the treatment of containers and to a plant for the treatment of containers.

BACKGROUND

Various plants for the treatment of containers are known from the prior art. In this way, filling means are known which fill containers, such as for example bottles of plastics material or glass, with liquids. In addition, so-called blow moulding machines or stretch blow moulding machines, which shape plastics material pre-forms into plastics material containers, are also known.

In this way, for example, EP 1 471 008 A1 describes a method and a system for monitoring a packing or bottling procedure. In this case first data information is detected which identifies the packing or a packing material used for forming the packing as well as second data information which is used for describing machine parts.

In addition, a container-treatment plant, which has a detection device for detecting properties of a container to be treated, as well as a comparator device for comparing the detection result of the detection device with a nominal container value, is known from the as yet unpublished Patent Application No. 10 2009 040 977.7 of the Applicants. The subject matter of this disclosure is hereby also made the subject matter of the following description in its entirety by reference.

In particular, when changing the programmes of machines in the beverage industry to a different type, for example to a new type of bottle, this is usually carried out on the machine by the operator or setter. In this case a type previously set up (which is available as a set of data) is selected in the menu and loaded. A set of data of this type contains for example mechanical setting values on the machine which the operator sees displayed for the change-over.

It is also known to manage the types of the individual machines centrally with a superordinated type management for example in an LMS (line-management-system) and to transfer them to machines involved in each case in accordance with a pending production order.

In this case, however, the problem arises that even the materials used influence the parameter settings on the machine in situ. If, for example, a plastics material pre-form with different material properties, for example with additives for the bonding of oxygen in the beverage, experience shows that this has an influence upon the setting of the heating and thus upon the heating parameters on the blow moulding machine. In addition, the nature of the surface of the bottle (roughness or coefficient of friction) can be affected and, as a result, the behaviour of the container during the processing in a labelling machine or in the inlet to a packing means can change. Experience also shows that the apparently similar materials of different manufacturers can behave very differently. The causes may be the manufacturing process used by the manufacturer for example for the plastics material pre-form, the process times set or other parameters.

As a result of this, a manual adjustment of the machine parameters used is required on the machines in a bottling plant. This adjustment causes losses in the form of machine stoppage times for the new settings required, losses in quality and thus loss of product and packaging material etc.

On the other hand, in most bottling plants it is not only one type of product that is produced. These plants are in fact designed in such a way that only one type is in production at any one point in time, but it is possible to change over to a different type in a simple manner. In this case the number of different types of production and the time intervals between changes can vary very greatly.

The types of production themselves comprise many categories, such as for example the package format, the package colour, the container format, the container colour, the nature and the decoration of the closure or even the number, the format and the decoration of the labels on the containers. In this case it is not necessary for all the machines of a plant or the parameters thereof to be dependent upon all the categories. In practice there is frequently a very large number of equipment variants, particularly in the case of labelling machines. In this case, in particular, the categories of the container format, the closure format and the provision of labels are relevant. The provision of labels can in turn be divided into subcategories, such as for example the usable volume, the product and country-specific contents.

If a conversion to a different type has to be carried out in the prior art, therefore, the production staff have to set the previously configured production type of the machine as well as mechanical conversion operations. This can be carried out for example by a superordinated master control (SCADA, MES) or directly at the machine operation. The selection from a list on a touch-screen display has become established as the usual manner for this input.

If, however, the number of types of production is very large (for example if the number of different provisions in a labelling machine frequently amounts in practice to several hundreds) then experience shows that the type is also changed within relatively short time intervals. In this case the selection from a list is confusing, time-consuming and prone to errors for the operating staff. Since the types differ in part in only one criterion, the texts of the type designators are frequently long and very similar. In every case only a small portion of the list is visible at any one time through the restricted area of the display, and the remaining parts must be shown in a laborious manner by scrolling through the list.

In this way, erroneous settings frequently occur, in which the user inadvertently selects an incorrect product or a different product is produced at least for a short time instead of the product actually provided. It may therefore be desirable to facilitate changes of type during the manufacture of containers and, in particular, beverage containers.

SUMMARY

In the case of a method according to the invention for operating a plant for the treatment of containers, the containers are treated with pre-set treatment parameters by a first treatment unit of the plant, and these treatment parameters are capable of being altered at least in part. In addition, the treatment parameters depend at least in part upon product parameters—characteristic of the container—of the containers to be treated.

According to the invention at least one product parameter characteristic of the container is determined by detecting a recognition mark associated with the container and at least one treatment parameter is altered on the basis of this characteristic product parameter.

It is therefore proposed that the type selection should not take place in a menu-driven manner, for example on a display, but with specially encoded containers or sample bottles. In this way, it is possible for each type capable of being selected to have provided for it a sample container with which a recognition mark is associated. In this case it is possible for this recognition mark to be applied to the container itself, for example for the container to be provided with a data matrix code, with reference to which the types can be clearly differentiated. It would also be possible, however, for a plurality of sample containers to be arranged in the storage devices in the cabinet and for the recognition devices to be associated in each case with the specified containers in a different, but clear, manner, for example in the form of labels which are arranged on the corresponding storage means for the containers. The recognition mark or the code can also be applied in advance in series by the label producer, for example on the rear label, or by way of an additional recognition mark such as an additional sticker on the sample bottle. It would also be possible for the recognition marks to be printed directly on the container. In addition and/or as an alternative, however, a selection by way of a list on a display can also be made available.

In order to carry out the change in the type, the machine operator has to select the encoded sample bottle, orientate the manual reader appliance—such as for example a Cognex DataMan 750—to its recognition mark or code, and enter the code by means of triggering the manual reader (for example by pressing a read-out button). The manual reader appliance is connected to the machine or plant (or the control thereof) by way of a suitable interface and it transmits the detected code there. It is thus possible for a change in the type to the corresponding type to be directly initiated by the detection of the new code.

In this way, the user can make the selection of the type by way of a ready equipped bottle. This is considerably simpler than the selection of text from a very long list.

A saving of time can therefore be achieved during the selection of the new production type. In addition, the operation may have the advantage that in the selection of the container the selection is made visually and also haptically, and, in this way, a substantially simpler and more secure control is possible for the operating staff and also only minor demands are made upon the abstract reasoning of the staff.

Furthermore, it would also be possible for the recognition mark also to be provided or additionally to be provided on a closure of the container. A container is understood below as also being, in particular, the unit of the container with the closure which closes it.

Furthermore, it would also be possible for the container itself to constitute a recognition mark, so that for example an image-recording appliance detects the shape of the container and correlates it clearly, in order to alter the corresponding parameters in this way.

The recognition mark can also for example be a parameter which is characteristic of the label, so that for example the parameters of a labelling machine can be changed over to the supply of a new type of label.

Furthermore, it would also be possible for the machine not to alter the parameters automatically, but to guide the user in carrying out the appropriate alteration steps.

In the case of an exemplary method the recognition mark is a sequence of symbols which is arranged on the container and which is characteristic of one or more product parameters. In this way it would be possible for a plurality of parameters to be capable of being read out from a sequence of symbols, such as for example a barcode.

It may therefore be advantageous for the sequence of symbols arranged on the container to be characteristic of a plurality of product parameters.

It may be advantageous for the recognition mark to be provided on a label of the container. This can be—as mentioned above—the actual product label, or even an addition label applied specifically for the recognition mark.

It may be advantageous for the treatment unit of the plant to have a plurality of treatment elements, and for the treatment parameters of a plurality of treatment elements to be altered. In this way, a plant of this type can have for example a filling device for filling the containers, labelling devices for labelling the containers, blowing stations for shaping plastics material pre-forms into plastics material containers, such as in particular stretch blow moulding machines, packing means, palletizers and the like.

It may be advantageous for the first treatment unit to be a shaping device for shaping plastics materials into containers. In addition, the first treatment unit can also be a labelling machine for labelling the containers or a filling device for filling the containers.

In the case of an exemplary method, information on the container to be produced is displayed to an operator by way of a display device in a manner dependent upon the parameters determined. To this end, for example, a selection of possible containers can be displayed to a user, in which case he or she can then select the correct container with reference to this (reduced) selection. In addition, the user or operator can be prompted by way of the display device to confirm a selection made by the machine. To this end a list of possible containers can be submitted to the user.

The present invention further relates to a plant for the treatment of containers with a first treatment unit, which treats the containers in a first pre-set manner, and with a control device which controls the treatment of the containers by the first treatment unit on the basis of pre-set treatment parameters, these treatment parameters being capable of being altered at least in part and depending at least in part upon product parameters—characteristic of the container—of the containers to be treated.

According to the invention the plant has a detection device for detecting a recognition mark associated with the container, the detection device communicating in terms of data with the control device at least for a time, in order to transmit product parameters of the container determined by detection of the recognition mark to the control device. In reaction to the corresponding product parameters the control device can change the treatment parameters automatically for example, or it can display to the user information on the alteration steps to be carried out.

In the case of an exemplary embodiment the detection device has an optical reading device which detects the recognition mark. This can be a barcode scanner for example.

In an exemplary embodiment the plant has a second treatment unit, which treats the containers in a second pre-set manner, and the control device controls the treatment of the containers by the second treatment unit on the basis of pre-set treatment parameters, and these treatment parameters are capable of being altered at least in part.

In this case an alteration of these operating parameters of the second treatment unit may be likewise advantageously carried out from the product parameters of the container which have been determined.

It may be advantageous for at least one treatment unit to be selected from a group of treatment units which contains blow moulding machines, in particular stretch blow moulding machines, labelling machines, filling means, sterilization devices, closing means and the like.

Further advantages and embodiments may be seen from the accompanying drawings.

DETAILED DESCRIPTION

Figure 1:
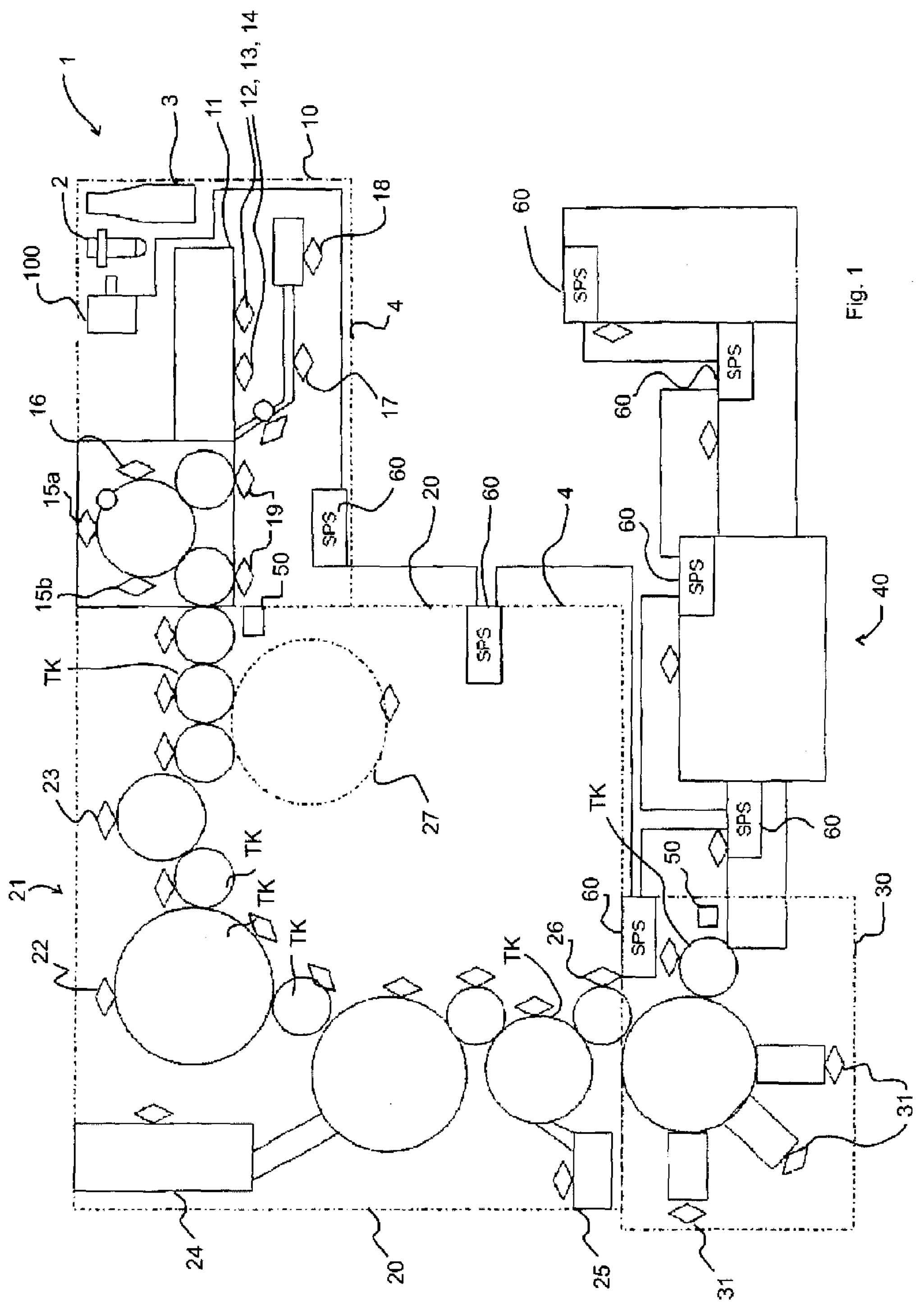
FIG. 1 is a diagrammatic illustration of an exemplary container treatment plant according to the prior art.

FIG. 1 is a diagrammatic illustration of a container treatment plant 1 for the treatment of containers capable of being filled with a product. Pre-forms 2 of plastics material or glass containers 3 are supplied to the container treatment plant. The container treatment plant comprises a stretch blow moulding module 10, a filling module or an automatic filling module exchange device 20, a labelling module 30 and a packing module 40. The stretch blow moulding module 10 and the filling module 20 are provided in each case with a protection device 4 in order to screen the stretch blow moulding module 10 and the filling module 20 from external actions and to protect operators from parts of the plant modules which could possibly endanger the operator during the operation of the plant.

In the stretch blow moulding module 10, pre-forms 2 of plastics material, such as for example polyethylene terephthalate (PET) or polypropylene (PP) are heated in a heating device 11, which comprises a heating mandrel or an automatic heating mandrel exchange device 12, a screening plate or an automatic screening plate exchange device 13 and reflectors or an automatic reflector exchange device 14, and they are shaped by means of a stretch blow moulding process into a container, such as for example a bottle, for a product, such as for example a liquid. To this end the stretch blow moulding module 10 additionally comprises a stretch rod/blowing nozzle or an automatic stretch rod/blowing nozzle exchange device 15*a*, a stretch curve/base curve or a stretch curve/base curve displacement or exchange device 15*b*, a blow moulding device or an automatic blow mould exchange device 16, a rail adjustment device 17, a roll distance adjustment device 18 and clamps or an automatic clamp exchange device 19 for gripping the containers.

In the case of the supply of glass bottles 3 to the container treatment plant 1 the stretch blow moulding module 10 can be bypassed. It is pointed out that in the sense of this description the containers capable of being filled with a product are to be understood as referring, in particular, to the pre-forms 2, the containers or plastic bottles produced from them, and the glass bottles 3.

The containers produced by the stretch blow moulding module 10 for the product are supplied by way of conveying devices, such as for example conveying turntables TK, to the filling module 20 which fills the containers with at least one product and then closes them. To this end the filling module 20 comprises a cleaning device 21 with a sterilization station 22 and a rinser 23 for cleaning the containers, a product mixer device 24 for mixing a product to be filled into the containers, a closure cap station 25 for supplying and applying closure caps to the containers, and a diverting star wheel or clamps 26 for the onward conveying of the containers. If necessary the containers arriving from the stretch blow moulding module 10 can be temporarily stored or buffered in a dynamic buffer 27.

After that the filled and closed containers are supplied to the labelling module 30, are labelled by it by means of at least one labelling device 31 and are then supplied by way of conveying devices, such as for example conveying turntables TK, to the packing module 40 in which the containers are packed.

In addition, the container treatment plant 1 comprises checking devices 50 for checking the containers 2 treated by means of the container treatment plant 1. In this case in FIG. 1 a checking device 50 is provided between the stretch blow moulding module 10 and the filling module 20 and a further checking device 50 is provided between the labelling module 30 and the packing module 40. If necessary, however, the checking devices 50 can also be provided on other or further places in the container treatment plant 1. Defective containers can be separated out with the aid of a checking result of the checking devices 50 before a further treatment by different modules of the plant.

Each of the modules 10, 20, 30 and 40 of the plant comprises, in addition, a plant module control device 60 which can be for example a memory programmable controller (programmable logic controller—PLC), as indicated in FIG. 1. In FIG. 1 the plant module control devices 60 are connected in series. The communication of the plant module control devices 60 with one another can be carried out by way of a wireless local network (wireless LAN) or by way of Bluetooth.

In addition, in order to detect properties of the containers or the product parameters, the container treatment plant 1 comprises a detection device 90 which can be a camera for example. The detection device 90 can also, however, be any sensor which is suitable for detecting recognition marks of the containers. A sensor of this type can operate for example on the basis of an optical, magnetic or mechanical principle etc. The detection device 90 is connected to the plant module control device 60 of the stretch blow moulding module 10. In addition, the detection device 90 can also communicate with a central control device 95, the central control device in turn transmitting relevant data on to the individual plant module control devices.

Figure 2:
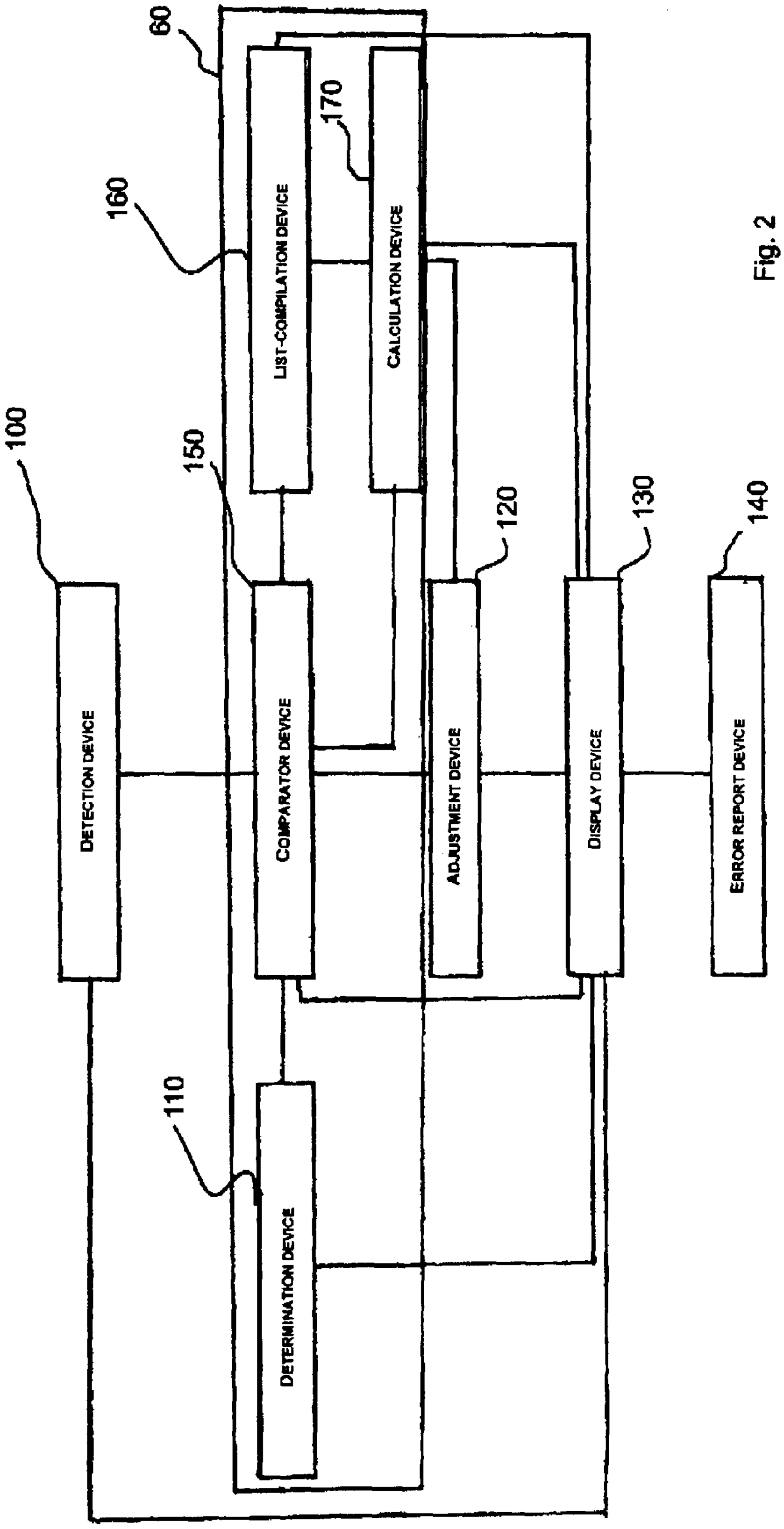
FIG. 2 is a flow chart according to the prior art.

FIG. 2 illustrates a method according to the internal prior art of the Applicants, in which the individual aspects, however, are capable of being combined with the features of the present invention.

As shown in FIG. 2, each plant module control device 60 has a determination device 110, a comparator device 150, a list-compilation device 160 and a calculation device 170. In this case the determination device 110 is used to determine the treatment elements mounted in the container treatment plant 1 or treatment results to be achieved by means of treatment elements or formulae for the treatment of the containers, which are described in greater detail below. To this end the treatment elements can be provided with RFID chips (RFID:

radio frequency identification) and/or a code, such as for example a barcode or another two-dimensional code, which is or are capable of being read out by radio or in accordance with an optical, magnetic or mechanical principle etc. The functioning of the comparator device 150, the list-compilation device 160 and the calculation device 170 is described in greater detail below.

In addition, the container treatment plant 1 has an adjustment device 120 shown in FIG. 2 for the adjustment of the treatment elements mounted in the container treatment plant 1 or treatment results to be achieved by means of treatment elements or formulae for the treatment of the containers, which are described in greater detail below. This means that in the sense of this description the term "treatment element" covers both a tool, such as for example the clamps 19, and treatment results to be achieved by means of treatment elements as well as formulae for the treatment of the containers.

The container treatment plant 1 has, in addition, a display device 130 shown in FIG. 2 for the display of information on, for example, operating states of the container treatment plant 1 or the individual modules 10, 20, 30, 40 thereof or the treatment elements thereof etc. The display device 130 can be any desired conventional display device.

In the event of an error during the operation of the container treatment plant 1 an error report device 140 can emit an error report, such as for example an optical or acoustic alarm. The alarm can also be indicated by means of the display device 130.

As described above, each of the plant modules 10, 20, 30 and 40 carries out a special or pre-determined treatment of the containers, such as stretch blow moulding, filling, labelling etc.

To this end each of the modules 10, 20, 30 and 40 of the container treatment plant 1 comprises a plurality of different fittings or treatment elements which are capable of being used in the different treatments of the containers. This means that the stretch blow moulding module 10 comprises for example the following treatment elements: heating mandrels 12, screening plate 13, reflectors 14, stretch rod/blowing nozzle 15, rail setting device 17, roll-distance setting device 18, clamps 19 etc.

Reference is also made to bottles below when the containers produced from the pre forms 2*a* or the glass containers 3 are meant.

Expressed in more precise terms, the individual named modules 10, 20, 30 and 40 of the container treatment plant and the plant modules not illustrated (pasteurization module for the pasteurization of products capable of being filled into containers, container cleaning module for cleaning containers and preferably returnable bottles, crate washing modules for washing crates) of the container treatment plant comprise for example the following individual treatment elements or treatment results to be achieved by means of treatment elements or formulae, the individual treatment elements not all being shown in FIG. 1 for the sake of simplification. In this case parameters capable of being altered are also illustrated in each case.

The named plant modules 10, 20, 30 and 40 and the numerous treatment elements thereof named above are known in each case from the prior art and are consequently not described in greater detail here. It may be preferable for the respective adjustment of the treatment elements to take place in a fully automatic manner.

The operation of the container treatment plant 1 associated with the adjustment device 120 will be described in greater detail below.

In a filling line of the container treatment plant 1 the detection device 90 detects recognition marks of one of the containers 2, 3 to be treated, as described above. The detection results of the detection device 90 are fed to the comparator device 150. The comparator device 150 then carries out a comparison of a detection result or the detection results of the detection device 90 with a nominal container value for the plurality of treatment elements 11 to 19, 21 to 27, 31.

The nominal container value indicates which type of container 2, 3 can be treated by the treatment element 11 to 19, 21 to 27, 31. This means that the nominal container value indicates for example whether the container 2, 3 is a pre-form 2 for example for a plastic bottle containing 0.5 liters, a pre-form 2 for example for a plastic bottle containing 1.0 liter, a pre-form 2 for example for a plastic bottle containing 1.5 liters etc. or a pre-form 2 of PET or PP, or a glass bottle 3 etc. Further values which can be associated with the nominal value of a container 2, 3 are: a height and/or a diameter of an opening of a pre-form 2 or container 2, 3; a diameter of a conveying ring (a bulge in the shoulder region of plastic bottles, in particular PET bottles); an overall height or a maximum diameter of a container, such as for example a bottle; a diameter at a specified height for the engagement of treatment units, specifically the diameters directly above and below the conveying ring, a ground clearance of a bulged container, for example a bottle (distance between the feet of the bottle from the injection point); a material or a material composition of the container 2, 3; a crystallinity of the material of the container 2, 3; a type of the thread and/or a closure (for example cork, snap closure, crown cap) of the container 2, 3; a diameter and a height of the closure; a colour of the container material; a wall thickness of the container 2, 3 in specified regions; degrees of strength, such as for example top load, of the container 2, 3.

The nominal container value can be stored in advance in a memory device (not shown). This memory device can, in particular, be the RFID chip or code mentioned above, which is attached to the treatment elements. It may be preferable for it to be a barcode.

If a comparison carried out by the comparator device 150 indicates that the detection result of the detection device 100 is not equal to the nominal container value for the at least one treatment element 11 to 19, 21 to 27, 31, the adjustment device 120 can adjust at least one treatment element 11 to 19, 21 to 27, 31 of the plurality of treatment elements 11 to 19, 21 to 27, 31. This means that the adjustment device 120 can either replace or move the at least one treatment element 11 to 19, 21 to 27, 31 of the plurality of treatment elements 11 to 19, 21 to 27, 31.

In addition, the list-compilation device 160 can compile a list in which the treatment elements 11 to 19, 21 to 27, 31 are listed, for which the comparison carried out by the comparator device 150 indicates that the detection result of the detection device is not equal to the nominal container value for the at least one treatment element 11 to 19, 21 to 27, 31. The list can be displayed on the display device 130. In this case the list can give indications as to which treatment elements still have to be replaced or moved, and/or indicate which treatment elements are just being replaced or moved. In this way an operator can choose whether the treatment elements still to be replaced or to be moved should be replaced or moved automatically, i.e. should be adjusted, or whether the operator should possibly adjust specified treatment elements himself or herself.

The calculation device 170 can preferably carry out a calculation of a sequence which is a sequence of an adjustment of at least one treatment element 11 to 19, 21 to 27, 31 of the plurality of treatment elements 11 to 19, 21 to 27, 31. It may be particularly advantageous for this sequence to be a sequence in which an opening of the protection device 4 of the container treatment plant 1 is not obstructed by the adjustment of at least one treatment element 11 to 19, 21 to 27, 31 of the plurality of treatment elements 11 to 19, 21 to 27, 31. In addition, this sequence can be displayed on the display device 130.

If a comparison carried out by the comparator device 150 indicates that the detection result of the detection device is not equal to the nominal container value for the at least one treatment element 11 to 19, 21 to 27, 31, the plant module control devices 60 prevent operation of the container treatment plant 1. This means that, in the event that the container treatment plant 1 is still in operation, if the comparison carried out by the comparator device 150 gives the result specified, the container treatment plant 1 is stopped by a device (not shown) to stop the container treatment plant 1. In the event, however, that the container treatment plant 1 is not in operation or is stopped, if the comparison carried out by the comparator device 150 gives the result specified, starting of the container treatment plant 1 is made impossible or is prevented. To this end the container treatment plant 1 can comprise a device (not shown) to prevent the container treatment plant 1 from starting. The forced stop of the container treatment plant 1 or the forced prevention of the container treatment plant 1 from starting can likewise be displayed on the display device 130.

In addition, in the specified cases in which an adjustment of at least one treatment element 11 to 19, 21 to 27, 31 is necessary, an error report which can also be displayed on the display device 130 can be emitted by means of an error report device 140.

Since the individual plant module control devices 60 are arranged in series in accordance with this embodiment, the plant module control device 60 of the filling module 20 can for example build on the results which have already been achieved by the plant module control device 60 of the stretch blow moulding module 10. This means that the comparator device 150, the list-compilation device 160 and the calculation device 170 of the plant module control device 60 of the filling module 20 can not only use the nominal container values, as is the case for the comparator device 150, the list-compilation device 160 and the calculation device 170 of the plant module control device 60 of the stretch blow moulding module 10, but also those already used by the comparator device 150, the list-compilation device 160 and the calculation device 170 of the plant module control device 60 of the stretch blow moulding module 10.

Second Embodiment

Apart from the design of the control of the plant modules 10, 20, 30 and 40, the second embodiment is identical to the first embodiment. Only the parts of the second embodiment which are different from the first embodiment are therefore described below. The same parts and parts signifying the same are provided with the same reference numbers.

Figure 3:
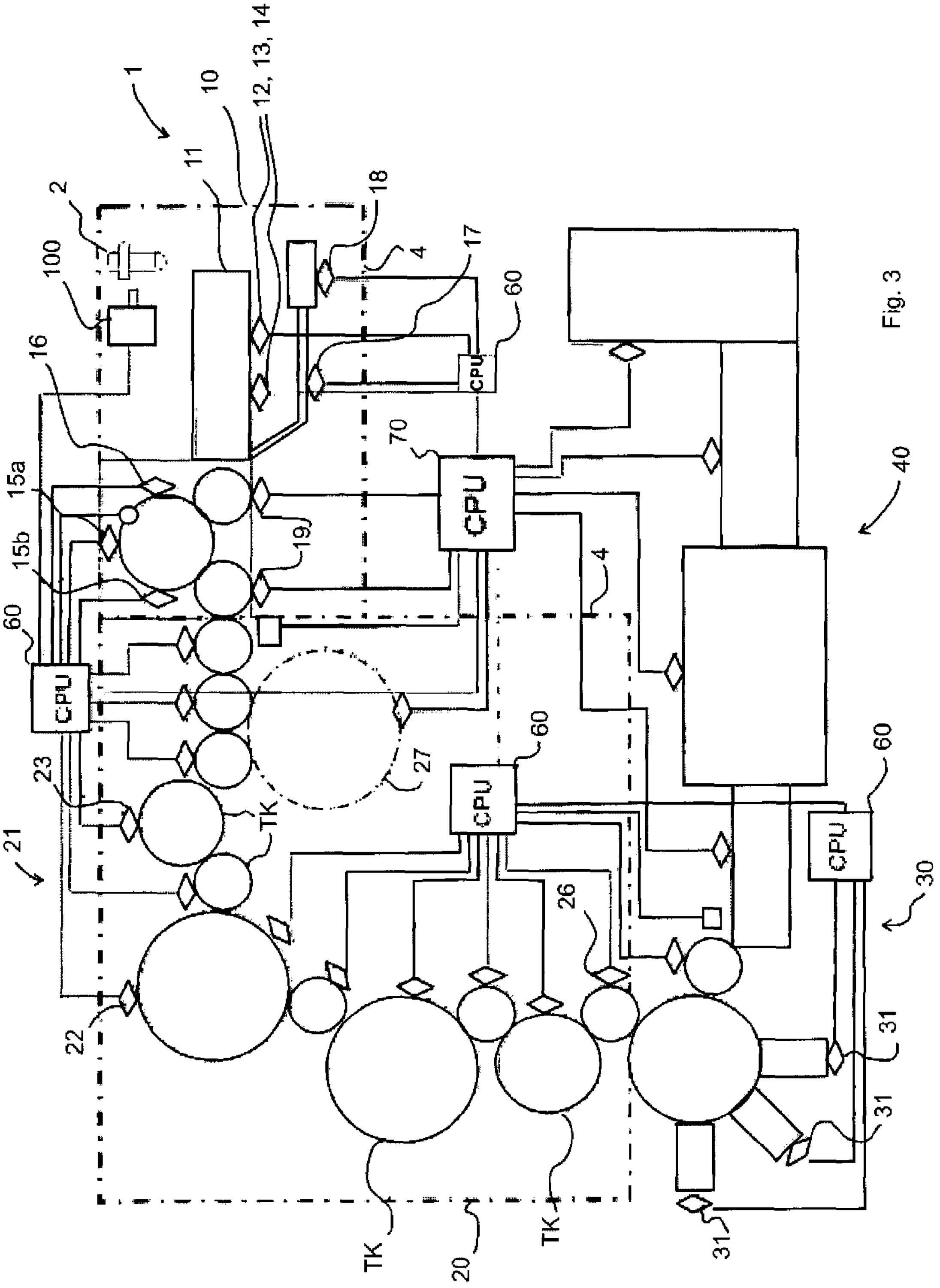
FIG. 3 is a diagrammatic illustration of an exemplary container treatment plant in a further embodiment according to the prior art.

As is evident from FIG. 3, the individual plant control devices 60 are not connected in series as in the case of the first embodiment, but they are connected to a central plant control device 70 by way of a bus system. This central plant control device 70 is superordinate to the individual plant control devices 60 and can give the individual plant control devices 60 control commands which can implement the individual plant control devices 60 for the plant modules 10, 20, 30 and 40. As additionally indicated in FIG. 3, both the individual plant control devices 60 and the central plant control device 70 have a CPU (central processing unit).

In accordance with the second embodiment the central plant control device 70 comprises the comparator device 150, the list-compilation device 160 and the calculation device 170. The central plant control device 70 then gives each of the plant control devices 60 commands on the basis of the results achieved by the comparator device 150, the list-compilation device 160 and the calculation device 170.

As shown in FIG. 3, the individual treatment elements are associated with different plant control devices 60 from what is shown in FIG. 1. This association can also be selected differently depending upon requirements.

All the other elements and functions in this embodiment are the same as those of the first embodiment and will therefore not be described once again.

(General)

All the arrangements of the container treatment plant 1 and the container treatment method, as described above, can be used individually or in any possible combinations. In this case, in particular, the following modifications are possible.

The control of the container treatment plant 1 can also be carried out by way of a separate computer. In this case an interface can be present on the detection device 100 which in particular can be a camera. The detection device 100 can communicate with the separate computer by way of the interface, for example by wire, by radio etc.

The evaluation of the results which are detected by the detection device 100 and which may be signals can also be carried out directly in the detection device 100 which is a sensor for example.

By way of example, the adjustment device 120 can be a robot which shuts down all the treatment elements of the container treatment plant 1 and carries out necessary adjustments to the treatment elements.

It is further possible for the replacement of the treatment elements to be carried out without tools by means of the adjustment device 120. This is possible, in particular, for the pivot arm and/or the heating mandrels 12 and/or the screening plates 13 for example.

In addition, the adjustment to the treatment elements of the filling module 20, the labelling module 30 and the packing module 40 as well as the checking devices 50 can be performed automatically if a suitable choice of formulae is carried out on the stretch blow moulding module 10, for example by an operator. An input by the operator could be carried out in practice with the choice of formulae or by input of the choice of formulae, in particular by way of a switching device (not shown), such as for example a push button.

It is additionally possible for the adjustment device 120 to adjust only a partial quantity of the treatment elements which have been designated as a whole as being due for adjustment. In this case it is possible for at least two treatment elements to be changed automatically by the adjustment device 120, whereas the other treatment elements, which have been designated as being still due for adjustment, are adjusted by an operator. Instead of the at least two treatment elements, at least three or more treatment elements can also be changed automatically by the adjustment device 120.

Figure 4:
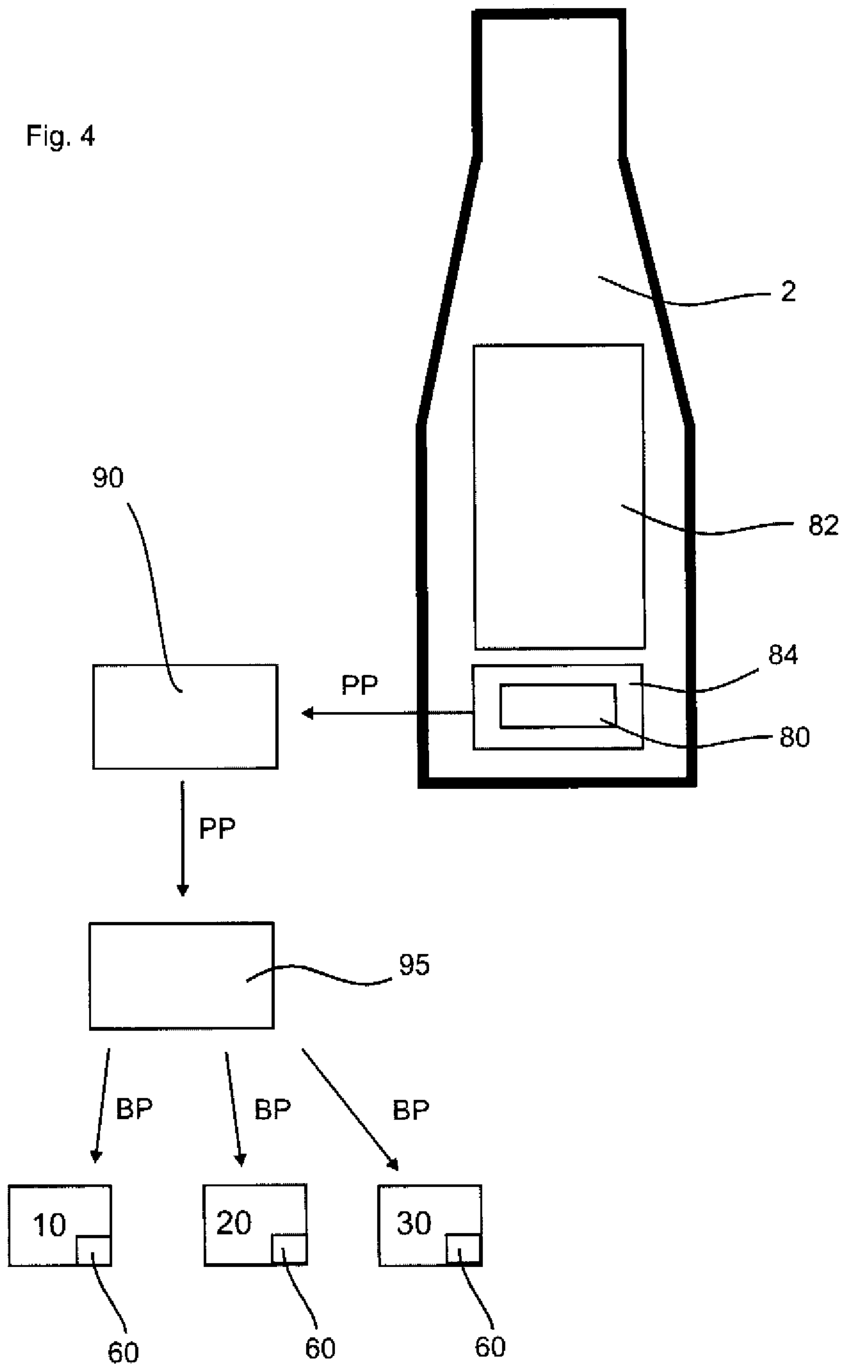
FIG. 4 is an illustration to explain the transfer of data.

FIG. 4 is an illustration to explain a method according to the invention for data transmission. In this case the reference number 90 relates to a detection device, such as for example a barcode reader, which is used for reading out a recognition mark 80 which is present on the container 2. This recognition mark 80 can be arranged on a separate label 84 on the container, but it would also be possible for the recognition mark to be arranged on the standard label 82 which is present on the container 2.

In this case the container 2 can be both a standard container and a special reference bottle. In this way, product parameters PP can be read out from the recognition mark 80 by means of the detection device 90. In principle it would be possible for the respective product parameters to be printed directly on the recognition mark, but it is preferable for symbols, for example a barcode, which are characteristic of at least one product parameter and preferably characteristic of a plurality of product parameters, to be applied to the recognition mark.

These product parameters can in this case be details on for example the material of the plastics material pre-form, the manufacturer of the plastics material pre-form, a pre-form charge, a closure material, a manufacturer of the container closures, a closure charge, a label material, a label manufacturer, a label charge, or for example also a cardboard or foil material.

In addition, however, further product parameters would also be possible, such as for example a volume of the finished container, details on the blow moulds to be used and the like. These product parameters are supplied to the individual machines or plants of the container treatment plant as relevant data on the material actually used for controlling the machine or even an individual machine control means 60. In this case it is possible for the detection device 90 to transmit the product parameters PP on to the central control device 95 described above. Just the central control device 95 can determine from the product parameters PP the individual treatment parameters BP which are then transmitted in each case to the individual plants 10, 20, 30 or the control devices thereof. It would also be possible, however, for the product parameters PP to be transmitted to the individual control means 60 and for these then to determine the individual treatment parameters from them. The individual changes and settings of the machine elements can be carried out on the basis of the individual treatment parameters, or, on the other hand, the user can be guided accordingly as to how the changes are to be carried out. Examples of the changes have already been indicated above.

It is thus not necessary in the case of the method illustrated in FIG. 4 for the containers to be measured, but it is simpler for the parameters characteristic of the container to be read out from the recognition mark and then to be used for changing the machine.

It will be apparent to those skilled in the art that various modifications and variations can be made to the method and apparatus for operating a plant for the treatment of containers with controlled parameter selection of the present disclosure without departing from the scope of the invention. Throughout the disclosure, use of the terms "a," "an," and "the" may include one or more of the elements to which they refer. Other embodiments of the invention will be apparent to those skilled in the art from consideration of the specification and practice of the invention disclosed herein. It is intended that the specification and examples be considered as exemplary only.

What is claimed is:

1. A method of operating a plant for the treatment of containers according to pre-set treatment parameters, which treatment parameters are alterable at least in part and depend at least in part upon product parameters characteristic of the containers to be treated, wherein a type of container being treated is changed, said method comprising:

providing as a first in line following a change in a type of container being treated, a specially encoded sample container having a recognition mark associated with the sample container;

determining at least one product parameter characteristic of the container by detecting the recognition mark associated with the container; and guiding a plant operator to alter at least one treatment parameter solely on a basis of the recognition mark detected upon a change in a type of containers being treated.

2. A method according to claim 1, wherein the recognition mark is a sequence of symbols which is arranged on the container and which is characteristic of the product parameter.

3. A method according to claim 2, wherein the sequence of symbols arranged on the container is characteristic of a plurality of product parameters.

4. A method according to claim 1, wherein the recognition mark is provided on a label of the container.

5. A method according to claim 1, wherein the plant has a plurality of treatment elements, the method further comprising altering treatment parameters of a plurality of treatment elements.

6. A method according to claim 1, wherein the plant includes a first treatment unit which is a shaping device for shaping plastics material pre-forms into plastics material containers.

7. A method according to claim 1, further comprising displaying information on the container to be produced by way of a display device in a manner dependent upon the parameters determined.

8. A method according to claim 1, wherein the recognition mark is a product label.

9. A method according to claim 1, wherein the recognition mark is on a label applied specifically for the recognition mark.

10. A method according to claim 5, wherein the plant has a labelling device for labelling the containers.

11. A method according to claim 7, wherein by way of the display device a selection of possible containers are displayed to a user, from which the user can select a correct container.

12. A method according to claim 1, wherein at least one product parameter is selected from the group consisting of a material of the plastics material pre-form, a manufacturer of the plastics material pre-form, a pre-form charge, a closure material, a manufacturer of the container closures, a closure charge, a label material, a label manufacturer, and a label charge.

13. A method according to claim 1, wherein at least one product parameter is a finished container volume.

14. A method according to claim 1, wherein the plant also manufactures containers.

15. A method according to claim 1, wherein a change in the type of containers is initiated based on detecting the recognition mark.

16. A method according to claim 1, wherein the at least one product parameter is characteristic of a container material.

17. A method according to claim 1, wherein each treatment parameter has a sample container with which an unique recognition mark is associated.

18. A method according to claim 1, wherein the recognition mark is applied to a container itself.

19. A method according to claim 1, wherein said recognition mark comprises a data matrix code.

20. A method according to claim 1, wherein a plurality of specially encoded sample containers are arranged in storage devices in a cabinet.

21. A method according to claim 1, wherein a recognition mark is applied to a label, and the label in turn is applied to a sample container.

22. A method according to claim 21, wherein the recognition mark is applied on a back label of a sample container.

23. A method according to claim 22, wherein an additional recognition mark is provided on an additional sticker on a sample container.

24. A method according to claim 1, wherein the recognition mark is provided on a closure of the container.

25. A method according to claim 1, wherein the container itself constitutes a recognition mark.

26. A method according to claim 1, wherein the recognition mark is printed directly on the container.

27. A method according to claim 1, wherein, in order to carry out a change in a type of container being treated, a user selects an encoded sample bottle, orientates a manual reader appliance to read the recognition mark, and enters the code by triggering the manual reader.

28. The method according to claim 27, wherein the manual reader is connected to the plant by an interface which transmits the detected code.

29. A method of operating a plant to form containers by blow moulding, comprising:

providing pre-forms having detecting recognition marks associated with a material forming the pre-form and the container being formed;

detecting at least one product parameter associated with the material forming the pre-form and/or the container being formed;

determining at least one product parameter characteristic of the material and/or the container being formed;

adjusting or altering treatment parameters based on the at least one product parameter characteristic of the material and/or the container being formed;

treating the containers with pre-set treatment parameters by a first treatment unit of the plant, said treatment parameters being alterable at least in part depending at least in part upon said at least one detected product parameter, characteristic of the container to be treated; and guiding a plant operator to alter at least one treatment parameter on the basis of a change of a characteristic product parameter detected upon a change in a type of containers.

* * * * *